United States Patent
Weiss et al.

(10) Patent No.: US 7,930,165 B2
(45) Date of Patent: Apr. 19, 2011

(54) PROCEDURE AND DEVICE FOR EMULATING A PROGRAMMABLE UNIT PROVIDING SYSTEM INTEGRITY CONTROL

(75) Inventors: Alexander Weiss, Flintsbach (DE); Alexander Lange, Feldkirchen-Westerham (DE)

(73) Assignee: Accemic GmbH & Co. KG, Flingsbach (DE)

(*) Notice: Subject to any disclaimer, the term of this patent is extended or adjusted under 35 U.S.C. 154(b) by 689 days.

(21) Appl. No.: 12/027,399

(22) Filed: Feb. 7, 2008

(65) Prior Publication Data

US 2009/0204383 A1  Aug. 13, 2009

(51) Int. Cl.
G06G 7/62 (2006.01)
G06F 9/455 (2006.01)
G06F 11/00 (2006.01)
G06F 9/44 (2006.01)
H03K 17/693 (2006.01)

(52) U.S. Cl. ............... 703/28; 703/17; 703/20; 703/23; 703/24; 703/27; 714/28; 714/29; 714/30; 714/38; 714/724; 716/1; 716/4; 716/16; 717/130; 717/134

(58) Field of Classification Search ............ 703/17, 703/20, 23, 24, 27, 28; 714/28, 29, 30, 38, 714/724; 716/1, 4, 16; 717/130, 134
See application file for complete search history.

(56) References Cited

U.S. PATENT DOCUMENTS

| 5,574,927 | A | * | 11/1996 | Scantlin | 712/41 |
| 5,600,579 | A | * | 2/1997 | Steinmetz, Jr. | 703/13 |
| 5,748,875 | A | * | 5/1998 | Tzori | 714/29 |
| 5,751,982 | A | * | 5/1998 | Morley | 712/209 |
| 5,771,240 | A | * | 6/1998 | Tobin et al. | 714/724 |
| 5,794,005 | A | * | 8/1998 | Steinman | 703/17 |
| 5,838,948 | A | * | 11/1998 | Bunza | 703/27 |
| 5,850,345 | A | * | 12/1998 | Son | 703/17 |

(Continued)

FOREIGN PATENT DOCUMENTS

WO  WO 2006/117377 A1  11/2006

OTHER PUBLICATIONS

MacNamee et al. "Emerging On-Chip Debugging Techniques for Real-Time Embedded Systems", Computing and Control Engineering Journal, Dec. 2000.*

(Continued)

Primary Examiner — Kamini S Shah
Assistant Examiner — Shambhavi Patel
(74) Attorney, Agent, or Firm — Ware, Fressola, Van Der Sluys & Adolphson LLP

(57) ABSTRACT

A method and corresponding equipment for emulation of a target programmable unit, which has at least one CPU, by means of an external emulation device, which is coupled to the target programmable unit by means of a communication link, comprising: transferring predetermined initialization data through the communication link to the emulation device for initializing the emulation; transferring through the communication link to the emulation device a CPU clock signal and emulation data; emulating the target programmable unit in the external emulation device using the transferred emulation data; ascertaining respective trace data from the emulation in the external emulation device and storing and/or outputting the trace data; deriving respective target integrity-control data and emulation integrity-control data from respective target-internal data and emulation-internal data; and transferring the derived target integrity-control data from the target programmable unit to the external emulation device.

36 Claims, 4 Drawing Sheets

U.S. PATENT DOCUMENTS

| | | | |
|---|---|---|---|
| 5,881,267 A * | 3/1999 | Dearth et al. | 703/27 |
| 5,903,744 A * | 5/1999 | Tseng et al. | 716/16 |
| 5,937,154 A * | 8/1999 | Tegethoff | 714/30 |
| 5,943,490 A * | 8/1999 | Sample | 703/28 |
| 5,963,736 A * | 10/1999 | Sarno et al. | 703/27 |
| 5,970,240 A * | 10/1999 | Chen et al. | 703/25 |
| 5,978,584 A * | 11/1999 | Nishibata et al. | 717/134 |
| 6,009,256 A * | 12/1999 | Tseng et al. | 703/13 |
| 6,026,230 A * | 2/2000 | Lin et al. | 703/13 |
| 6,117,181 A * | 9/2000 | Dearth et al. | 703/22 |
| 6,141,636 A * | 10/2000 | Sarno et al. | 703/23 |
| 6,173,243 B1 * | 1/2001 | Lowe et al. | 703/14 |
| 6,230,119 B1 * | 5/2001 | Mitchell | 703/27 |
| 6,609,247 B1 * | 8/2003 | Dua et al. | 717/128 |
| 6,684,169 B2 * | 1/2004 | Masella et al. | 702/66 |
| 6,715,043 B1 * | 3/2004 | Stevens | 711/154 |
| 6,718,485 B1 * | 4/2004 | Reiser | 714/38 |
| 6,751,583 B1 * | 6/2004 | Clarke et al. | 703/17 |
| 6,785,873 B1 * | 8/2004 | Tseng | 716/4 |
| 6,826,748 B1 * | 11/2004 | Hohensee et al. | 717/130 |
| 6,954,923 B1 * | 10/2005 | Yates et al. | 717/130 |
| 6,973,417 B1 * | 12/2005 | Maxwell et al. | 703/2 |
| 6,978,233 B1 * | 12/2005 | Burns | 703/27 |
| 6,978,462 B1 * | 12/2005 | Adler et al. | 719/318 |
| 7,143,019 B2 * | 11/2006 | Gabele et al. | 703/13 |
| 7,440,884 B2 * | 10/2008 | Beletsky et al. | 703/24 |
| 7,480,609 B1 * | 1/2009 | Cavanagh et al. | 703/23 |
| 2002/0161568 A1 * | 10/2002 | Sample et al. | 703/25 |
| 2003/0071165 A1 * | 4/2003 | Fiebick et al. | 244/3.1 |
| 2003/0101039 A1 * | 5/2003 | Gabele et al. | 703/16 |
| 2003/0101040 A1 * | 5/2003 | Nightingale | 703/17 |
| 2003/0225565 A1 * | 12/2003 | Garcia et al. | 703/23 |
| 2004/0015885 A1 * | 1/2004 | Akatsuka | 717/134 |
| 2004/0093507 A1 * | 5/2004 | Courcambeck et al. | 713/193 |
| 2004/0111252 A1 * | 6/2004 | Burgun et al. | 703/28 |
| 2004/0148153 A1 * | 7/2004 | Beletsky et al. | 703/27 |
| 2005/0005063 A1 * | 1/2005 | Liu et al. | 711/112 |
| 2006/0074622 A1 * | 4/2006 | Scott et al. | 703/23 |
| 2006/0143522 A1 * | 6/2006 | Multhaup et al. | 714/28 |
| 2008/0288719 A1 * | 11/2008 | Schmitt et al. | 711/104 |
| 2010/0161306 A1 * | 6/2010 | Burgun et al. | 703/20 |

OTHER PUBLICATIONS

Tsal et al. "A Noninterference Monitoring and Replay Mechanism for Real-Time Software Testing and Debugging", IEEE Transactions on Software Engineering, vol. 16, No. 8, Aug. 1990.*

Mayer et al. "Boosting Debugging Support for Complex Systems on Chip", IEEE Computer Society, 2007.*

Hu et al. "TraceDo: An On-Chip Trace System for Real-Time Debug and Optimization in Multiprocessor SoC", 2006.*

Melear et al. "Emulation Techniques for Microcontrollers with Internal Caches and Multiple Execution Units", IEEE 1997.*

Nanda et al. "MemorIES: A Programmable, Real-Time Hardware Emulation Tool for Multiprocessor Server Design", ASPLOS 2000.*

* cited by examiner

PROCEDURE AND DEVICE FOR EMULATING A PROGRAMMABLE UNIT PROVIDING SYSTEM INTEGRITY CONTROL

BACKGROUND OF THE INVENTION

1. Technical Field

The present invention relates to a method for emulation of a target programmable unit, which has at least one central programmable unit (CPU), by means of an external emulation device, which is coupled to the target programmable unit by means of a communication link. The invention also relates to a programmable unit, which has at least one CPU and an emulation port as a communication link for transferring emulation data to an external emulation device. Furthermore, the invention relates to an emulation device having an emulation port for communication with an external target programmable unit for receiving emulation data, and to an apparatus for emulation of a programmable unit, comprising a target programmable unit and an emulation device.

2. Discussion of Related Art

The development of microcontrollers is accompanied by comprehensive functional testing. Error-free software operation on microcontrollers is critical in many application fields. For instance, microcontrollers are used in the control of automobile steering or engine control and perform functions that can be critical for the safety of car drivers and their passengers.

An important requirement for testing and certifying software is the provision of trace data, which gives information on individual operational steps performed during the execution of a computer program. A set of trace data comprises addresses of the processed code, optionally read and written data, CPU registers and associated time stamps.

In some applications it is indispensable to provide the trace data under real-time conditions. The retrieval of trace data from microcontrollers for such application purposes has been challenged by the progress of semiconductor technology in recent years. Such advanced microcontrollers are typically operated at clock frequencies between several 100 MHz up to 1 GHz. Furthermore, processor cores even of embedded systems become increasingly complex. Peripheral units such as display controllers, USB (Universal Serial Bus) host and slave controllers and fast Ethernet controllers have been integrated on-chip into the microcontroller devices, in addition to the on-chip integration of random access memory (RAM) and flash memory.

A further difficulty in the software development for an embedded system is that recent developments show an increase of the use of multicore microcontrollers. In a multi-core-microcontroller, several identical or non-identical CPU cores are integrated on chip. This further complicates the retrieval of trace data, because trace data have to be monitored for every CPU core.

To obtain trace data some known solutions implement a trace-monitoring unit into the microcontroller. The trace-monitoring unit is an embedded special-purpose hardware, which traces a software application step by step and records relevant and detectable system states such as program addresses, register content and memory content. However, not all internal quantities of interest can be detected by an embedded trace-monitoring unit, given the limited space that can be allocated for this purpose and the limited monitoring capacity of an embedded trace-monitoring unit. In multicore microcontrollers using an embedded trace capture unit, a separate trace interface has to be provided for every CPU core.

Some microcontrollers provide a trace memory (also called trace buffer) for buffering a limited amount of trace data. However, the trace buffer is very limited in size and allows buffering the trace data for only a small amount of some 10 or 100 operations, which is comparable to a "snap-shot" of trace data only. Therefore, the limitations in the trace buffer size lead to a loss of trace information that can be provided.

For a continuous transfer of trace data buffered in an on-chip trace buffer to an analyzing system some bandwidth is required for transmission via a corresponding interface. The bandwidth requirement can often only be met if the data stored in the trace buffer is reduced by filtering and if the CPU clock is decreased during recording the trace data.

Many microcontrollers comprise a standardized JTAG (Joint Test Action Group) interface. The JTAG interface usually serves for testing and debugging purposes. The JTAG interface is sometimes also used for providing trace information from an embedded trace-monitoring unit or trace buffer to an external analyzing system. However, the JTAG interface is neither available nor suitable for continuous transmission of large amounts of trace data. Since this solution thus often does not provide a suitable bandwidth, for instance for real-time transmission of the trace information to an external analyzing system, a real-time execution of a computer program for testing purposes is not possible, which renders this testing technology unsuitable for some applications. Some microcontrollers provide a dedicated trace adaptor for reading from the trace buffer. While this allows increasing the depth of trace information, such microcontrollers with special trace adaptors require additional pins and chip core area and are also too expensive in mass production. It has also been observed that this technique is less suitable for testing at very high processing speeds.

Bond-out-chip based in-circuit emulators (ICE) provide a better performance but also represent the most expensive technique to retrieve trace data. Bond-out-chip based in-circuit emulators usually take the form of a special test version of the target microcontroller under test, a so-called bond-out chip, which allow access to all relevant internal signals via dedicated pins. This allows monitoring and storing certain register content in real time for the purpose of debugging.

However, bond-out chips are very expensive. The additional design and production steps involved in the fabrication of a bond-out-chip induce a delay in the development process of the microcontrollers. These disadvantages are multiplied in the development of a microcontroller series exhibiting derivatives with design variations for different application purposes.

Clock rates in bond-out-chip based ICE debugging are typically limited to values of up to 50 MHz, which is a disadvantage for many applications, which require testing under real-life conditions with clock rates of up to 1 GHz.

A further disadvantage of bond-out-chip based in-circuit emulators is that the software development is performed on evaluation chips with a special design, which is different from the design of those chips, which will eventually be fabricated in mass production.

From WO 2006/117377, which is incorporated herein by reference in its entirety, a procedure and a device for emulating a programmable unit are known, in which desired trace date is not taken from the target CPU directly, but is determined and made available by a replication of this target CPU by an external and separate emulation device. The emulation of a target programmable unit by means of the external emulation device comprises transferring predetermined initialization data through a communication link to the emulation device. The initialization data is data that the target programmable unit has used for initializing itself. A CPU clock signal of the target programmable unit and the following data is transferred through the communication link in a defined relationship with the CPU clock signal: data read by the CPU from a data bus of the target programmable unit, and those external events that have an influence on the program counter. Additional data can be transferred in special embodiments, such as events that trigger a data transfer by passing the CPU, periodically created complete or partial copies of the register memory, or one or more data type signals. The target programmable unit is emulated in the external emulation device using the transferred emulation data. Trace data are ascertained from the emulation in the external emulation device and stored and/or output for subsequent analysis.

The technique of WO 2006/117377 A1 reduces the required bandwidth for data transmission between the target microcontroller and the analyzing system, because it only requires transmitting the small amount of emulation data mentioned to the emulation device during emulation. It further allows a simpler structure of the data output from the target programmable unit, which reduces the required chip area and the fabrication cost.

In contrast to the use of ICEs, which run with a bond-out chip and also require a new bond-out chip for each new microcontroller derivative with different peripherals, the technology of WO 2006/117377 A1 only requires a copy of the CPU core, i.e., arithmetic-logic units (ALUs), controller logic, bank of registers, pipeline, etc. An emulation of the internal peripherals of the target microcontroller, such as analog-digital converters, UART, CAN, etc. is not required.

However, it would be desirable to improve this technology in order to prevent that the CPU of the emulation device executes code different from that of the target CPU. To this end, such situations must be reliably detected.

DISCLOSURE OF THE INVENTION

According to a first aspect of the invention, a method for emulation of a target programmable unit, which has at least one CPU, by means of an external emulation device, which is coupled to the target programmable unit by means of a communication link is provided. The method comprises in one embodiment the following steps:
 transferring predetermined initialization data through the communication link to the emulation device, with which initialization data the target programmable unit (1) has initialized itself and/or has been initialized, for initializing the emulation;
 transferring through the communication link to the emulation device, a CPU clock signal and, in a defined relationship with the CPU clock signal, the following emulation data:
  data read by the CPU from a data bus of the target programmable unit,
  those external events that have an influence on a program counter;
 emulating the target programmable unit in the external emulation device using the transferred emulation data;
 ascertaining respective trace data from the emulation in the external emulation device; and
 storing and/or outputting the trace data;
 deriving, in the target programmable unit and in the external emulation device, respective target integrity-control data and emulation integrity-control data from respective target-internal data and emulation-internal data, which target-internal data comprises data transferred on a target-internal bus connecting the CPU in the target programmable unit with a memory and peripheral units in the target programmable unit, and which emulation-internal data comprises data transferred on an emulation-internal bus connecting the CPU in the emulation device with a memory in the emulation device; and
 transferring the derived target integrity-control data from the target programmable unit to the external emulation device.

Note that in the above process definition, emulation data is to be differentiated from emulation-internal data. Emulation data is transferred from the target programmable unit to the emulation device and allows the emulation device to perform the emulation of the target. Emulation-internal data is the abovementioned data, which is transferred within the emulation device through the emulation-internal bus.

In one embodiment, the emulation data additionally comprises periodically created complete or partial copies of the register memory. In another embodiment, the emulation data additionally comprises one or more data type signals. The additional emulation data of these two embodiments are in another embodiment both provided via the communication link.

In a further embodiment, the target-internal data and the emulation-internal data additionally comprises data transferred on the bus by direct memory access, i.e., to and from a respective memory or periphery unit within the target programmable unit and the emulation device, respectively. Preferably, the target-internal data and the emulation-internal data does not comprise any more data than that used by this embodiment.

The method of the first aspect of the invention provides for deriving and transferring target integrity-control data from the target programmable unit to the external emulation device, and for deriving emulation integrity-control data from the emulation device. Under desired error-free execution in both the target programmable unit and the external emulation device, emulation integrity-control data and target integrity-control data should be identical at any given point in time during execution. With these two types of integrity-control data provided, valuable information is retrieved for detecting and analyzing an undesired state, in which the target programmable unit and the external emulation device currently execute different code or access different memory regions.

In one preferred embodiment, this allows detecting a divergence in the execution of program code in the target programmable unit and in the emulation device by a comparison of the respective target integrity-control data and emulation integrity-control data for a given point in time. Divergence is present if the code currently executed or data read/written by the target programmable unit and by the external emulation device is not identical. An integrity-warning signal at the external emulation device is generated in one embodiment if the target integrity-control data and the emulation integrity-control data are not identical. Additionally or alternatively, the ascertaining of respective trace data at the external emulation device can be stopped if the target integrity-control data and the emulation integrity-control data are not identical.

On the basis of the invention, in preferred embodiments integrity information is made available that is helpful in finding the cause of an observed divergence. Such information can currently not be made available by the known techniques, or only under particularly high effort, since the point in time, at which an error causing the divergence occurs, cannot be ascertained with sufficient accuracy. In particular, such an error analysis is currently not possible for chips in mass production, but only for special chips for test purposes, such as bond-out chips or other types of evaluation chips. Such chips have a circuit layout that differs from the layout of actual mass-production chips, rendering the obtained debugging information hardly transferable to the actual microcontroller product to be sold in the market. For this reason, software execution errors observed in mass production chips have to date not been completely detectable and traceable to their cause.

In one embodiment, deriving the target integrity-control data and emulation integrity-control data by the target programmable unit and the external emulation device comprises ascertaining respective internal data comprising one or more from the group of
- address data of payload data read or written by the CPU on a data bus of the target-internal and emulation-internal bus, respectively;
- payload data read or written by the CPU or transferred by DMA and currently on the data bus of the target-internal and emulation-internal bus, respectively;
- address data on a program bus of the target-internal and emulation-internal bus;
- payload data on the program bus of the target-internal and emulation-internal bus;
- bus control signals on the target-internal and emulation-internal bus, respectively;
- CPU flags.

In another embodiment, deriving the target integrity-control data and emulation integrity-control data comprises calculating at least one hash, for instance a check sum, of the internal data. A hash, which is also referred to in the art as a hash value, hash code, or hash sum, is the result of an evaluation of a hash function. Different hash functions and algorithms are well known in the art. They can be described as a deterministic reproducible method of transforming data from a large domain into a hash code from a (relatively) smaller range of code values. A hash may serve as a compact fixed-size digital "condensation" of variably sized data for purposes of data analysis.

Preferably, a plurality of hash codes is calculated and provided for analysis if a system violation is detected. Suitably, the hash codes are differentiated according different specific types of respective internal data. This allows an improved precision in the tracking of the cause of an integrity violation.

Calculating the at least one hash can for instance be performed with respect to one clock cycle. Alternatively, however, a plurality of consecutive clock cycles can be used for the calculation of the hash. In one embodiment, calculating the hash is performed with respect a current and a next-previous clock cycle. By means of such a recursive procedure, it is possible to secure detecting deviations in the code execution at the closest-possible point in time after their occurrence, if currently a transfer of hashes is not possible due to an ongoing transfer of emulation data. This is particularly useful in an embodiment that uses the communication link in time multiplex for emulation data and integrity-control data.

In such an embodiment, thus, transferring the emulation data and the target integrity-control data from the target programmable unit to the external emulation device is performed through the communication link in time multiplex. This way, the number of communication lines between the target and the emulation device as well as the number of pins on the target programmable unit can be kept small.

However, two alternative embodiments have advantages in other application contexts. Transferring the target integrity-control data can in a first alternative embodiment also be performed through an integrity-control communication link separate from the communication link in parallel to transferring the emulation data. This provides a particularly large transmission bandwidth for applications, in which a high data rate on either the communication link or the integrity-control communication link is important. Note that the terms "communication link" and "integrity-control communication link" refer to different transmission channels, typically implemented by different communication wires, implying the use of different connection ports or pins on the target programmable unit.

In a second alternative embodiment, transferring the emulation data and the target integrity-control data from the target programmable unit to the external emulation device is performed through the communication link in time multiplex, and a predetermined reduced amount of target integrity-control data is transferred through a separate integrity-control communication link in parallel to transferring the emulation data or the target integrity-control data. In this embodiment, the integrity-control communication link can be kept simple with a low transmission bandwidth, and be used continuously for only a limited amount of integrity-control data, while additional, complementary integrity-control data is provided in time-multiplex via the communication link.

In embodiments, which comprise a separate integrity-control communication link beside the communication link for emulation data, transferring the target integrity-control data and the emulation data preferably comprises distributing the target integrity-control data and the emulation data over a fixed number of predetermined I/O-pins of the target programmable unit. The distributing is performed in dependence on respective momentaneous emulation data, which are currently to be transferred.

A ring buffer can be used to advantage in order to gain more information on causes of an integrity violation such as a divergence between the target programmable unit and the emulation device. To this end, an embodiment of the method of the invention additionally comprises
- continuously storing the trace data in a ring buffer in the emulation device;
- stopping the storage of trace data in the ring buffer upon detecting that the target integrity-control data and the emulation integrity-control data are not identical;
- reading the trace data currently stored in the ring buffer after stopping the storage.

Freezing the content of the ring buffer and reading the trace data stored in the ring buffer at the point of freezing can provide additional valuable information quickly because it reflects the most recent trace data up to the point of detecting the integrity violation. Instead of a ring buffer, other types of buffer memory can be used. Generally, a FIFO (First In First Out)-type memory is preferred.

In systems requiring a particularly high level of reliability of operation and involving high risks in case of operational failure, the target programmable unit may be provided with a multiply redundant microcontroller-based processing system that has a plurality of at least two redundant control units, each control unit comprising a CPU and associated peripheral units (memory, communication interfaces, etc.) in a parallel configuration. In such embodiments, a corresponding number of redundant identical external emulation devices connected in parallel in a corresponding multiply redundant external emulation arrangement is provided, each emulation device being connected with one corresponding control unit. Respective target integrity-control data and emulation integrity-control data is derived at each of the redundant control units and corresponding emulation devices. The respective target integrity-control data and the respective emulation integrity-control data are preferably compared for each combination of control unit and allocated external emulation device, and a respective integrity-warning signal at the respective external emulation device can be generated, if the respective target integrity-control data and the corresponding emulation integrity-control data are not identical. The output data generated at one of the redundant emulation devices is in one embodiment selected for outputting, using a selection criterion that excludes a combination of a control unit and allocated emulation device, for which an integrity-warning signal has been generated.

Therefore, the integrity control information provides an important criterion for an external voter logic in the selection of output data of a control unit that represents an undisturbed integrity.

The method of this embodiment has particular advantages in application cases requiring very high levels of reliability of operation. Note that the output data generated by one of the redundant control unit devices is different from trace data provided by this emulation device. The output data provides the desired output of a processing system, such as control signals for a break or steering unit in a vehicle, as will be elaborated further below in more detail. The present embodiment thus forms a method for operating a processing system with redundant control units and associated emulation units, which as such is an independent aspect of the invention.

In some embodiments, the microcontroller-based processing system has an odd number of redundant control units. This allows making a majority decision in accordance with well-known prior-art voting schemes. However, the present invention also allows providing a microcontroller-based processing system with an even number of control units. For instance, only two redundant control units can provide sufficient information for a voter logic using the concept of the present invention. Two sets of computing results of the control units, which each represent the desired output data of the microcontroller-based processing system, are fed to the voter logic. In case of an integrity violation, the sets of computing results are different, and typically one of the sets is accompanied by negative integrity-control information indicative of a divergence situation or, in other words, the integrity violation. The voter logic is suitably configured to decide in this situation to forward to its output that received output data (computing result), which is associated with positive integrity-control data. The voter logic is further configured to block output data received and associated with negative integrity-control data. This way, an erroneous operation of the microcontroller-based processing system is prevented efficiently.

As an example, consider a microcontroller-based processing system used for controlling an automatic triggering of an emergency break operation in a vehicle. The processing system may produce, on the basis of identical input signals, as a computing result of a first control unit a signal for triggering the emergency break mechanism, and as a computing result of a second redundant control unit a signal that does not lead to triggering the emergency break mechanism. Obviously, only one of the results can be correct. However, the correct result must be found quickly to avoid any risk for the vehicle passengers. A check of the target integrity-control data of both control units will allow the voter logic a weighting operation of the two computing results, which is valuable information for a correct decision and reliable operation of the CPU arrangement.

From the last paragraphs it becomes obvious that the derived integrity-control data can not only be used to enable a better analysis of trace data, but also to ensure safe operation of an embedded system at rather low cost, by enabling the use of a target programmable unit that has a redundant CPU structure with only two mutually redundant CPUs.

According to a second aspect of the invention, a programmable unit is provided, which in one embodiment has at least one CPU, and an emulation port as a communication link for transferring emulation data to an external emulation device. The programmable unit is configured to provide at the emulation port, in a defined relationship with a CPU clock signal of the programmable unit, the following emulation data for output through the communication link to the emulation device:

data read by the CPU and optionally DMA from a data bus of the programmable unit, those external events that have an influence on the program counter, optionally, periodically created complete or partial copies of the register memory, and, optionally, one or more data type signals;

to provide the CPU clock signal as an output for transfer to the emulation device;

to derive target integrity-control data from target-internal data, which target-internal data comprises or is indicative of data transferred on a target-internal bus connecting the CPU in the target programmable unit with a memory and peripheral units in the target programmable unit; and to provide the target-integrity data as an output.

The programmable unit provides the structure functionality that allows operation as a target programmable unit in performing the method of the first aspect of the invention. It thus shares the advantages of the method of the first aspect of the invention. With the invention, it becomes possible to use mass-production programmable units such as microcontrollers or embedded microcontrollers destined for the application field also in software debugging processes during development and testing of the microcontroller.

The programmable unit is in one embodiment configured to derive the target-integrity control data from internal data of the programmable unit selected from the group of payload data read or written by the CPU or transferred by DMA and currently on the data bus of the target-internal bus;

address data on a program bus of the target-internal bus;

payload data on the program bus of the target-internal bus;

bus control signals on the target-internal bus; and

CPU flags.

In another embodiment, the programmable unit is configured to derive the target integrity-control data by calculating at least one hash code of the internal data. Preferably, it is further configured to calculate a plurality of hash codes, each hash code being associated with an allocated type or group of types of respective internal data.

In a further embodiment, the programmable unit is configured to calculate the hash code with respect to a current and a next previous clock cycle.

In a further embodiment, the programmable unit is configured to transfer the emulation data and the target integrity-control data to the external emulation device through the communication link in time multiplex.

The programmable unit is in another embodiment configured to transfer the target integrity-control data through an integrity-control communication link separate from the communication link in parallel to transferring the emulation data.

Alternatively, it is configured to transfer the emulation data and the target integrity-control data from the target programmable unit to the external emulation device through the communication link in time multiplex, and to transfer a predetermined reduced amount of target integrity-control data through an integrity-control communication link separate from the communication link in parallel to transferring the emulation data or the target integrity-control data through the communication link.

The programmable unit that uses the integrity-control communication link in addition to the communication link can comprise a state machine that is configured to transfer the target integrity-control data and the emulation data by distributing the target integrity-control data and the emulation data over a fixed number of predetermined I/O-pins of the programmable unit, and to distribute the mentioned data in dependence on respective momentaneous emulation data, which are currently to be transferred.

According to a third aspect of the invention, an emulation device is provided. The emulation device comprises in one embodiment an emulation port for communication with an external target programmable unit for receiving emulation data, a program memory for storing program code functionally identical to that stored in the external target programmable unit;

The emulation port of the emulation device of the third aspect of the invention is configured to receive a CPU clock signal from the target programmable unit and to receive, in a defined relationship with a CPU clock signal of the target programmable unit, the following emulation data:

data read by a CPU of the external target programmable unit from a data bus of the target programmable unit, those external events that have an influence on the program counter.

In one embodiment, the emulation data additionally comprises periodically created complete or partial copies of the register memory. In another embodiment, the emulation data additionally comprises one or more data type signals. The additional emulation data of these two embodiments are in another embodiment both provided via the communication link.

The emulation device of the third aspect of the invention is further configured to emulate the external target programmable unit using the transferred emulation data and program code stored in the program memory;

to receive target integrity-control data from the external target programmable unit, and to derive emulation integrity-control data from emulation-internal data, which emulation-internal data is indicative of a respective code currently executed by the programmable unit, and to provide the emulation-integrity data as an output.

The emulation device of the third aspect of the invention shares the advantages of the method of the first aspect of the invention.

In one embodiment, the emulation device is configured to ascertain respective trace data from the emulation on the basis of the received emulation data, and to store and/or the output the trace data.

In another embodiment, the emulation device is configured to derive the emulation integrity-control data by ascertaining respective emulation-internal data selected from the group of payload data read or written by a CPU of the emulation device or transferred by DMA and currently on a data bus of an emulation-internal bus;

address data on a program bus of the emulation-internal bus;

payload data on the program bus of the emulation-internal bus;

bus control signals on the emulation-internal bus; and

CPU flags.

In a further embodiment, the emulation device is configured to derive the emulation integrity-control data by calculating at least one hash code of the emulation-internal data. Preferably, it is configured to calculate a plurality of hash codes, each hash code being associated with an allocated type of respective internal data.

In another embodiment, the emulation device is configured to calculate the hash code with respect to a current and a next-previous clock cycle.

The emulation device can be configured to demultiplex emulation data and the target integrity-control data received from the external target programmable unit through the communication link in time multiplex.

The emulation device is in another embodiment configured to receive the target integrity-control data through an integrity-control communication link separate from the communication link in parallel to receiving the emulation data.

The emulation device can also be configured to demultiplex the emulation data and the target integrity-control data received from the target programmable unit through the communication link in time multiplex, and to receive a predetermined reduced amount of target integrity-control data through an integrity-control communication link separate from the communication link in parallel to receiving the emulation data or the target integrity-control data through the communication link.

The emulation device is preferably configured to compare the derived target integrity-control data and the emulation integrity-control data. Additionally or alternatively, it can be configured to generate an integrity-warning signal if the target integrity-control data and the emulation integrity-control data are not identical. It can further be configured to stop ascertaining respective trace data if the target integrity-control data and the emulation integrity-control data are not identical.

One embodiment of the emulation device further comprises a ring buffer, wherein the emulation device is configured to continuously store the trace data in the ring buffer during operation;

to stop storing the trace data in the ring buffer upon detecting that the target integrity-control data and the emulation integrity-control data is not identical; and to provide the trace data stored in the ring buffer at the point of stopping the storage.

According to a fourth aspect of the invention, an apparatus for emulation of a programmable unit is provided, comprising a target programmable unit according to the second aspect of the invention or one of its embodiments and an emulation device according to the third aspect of the invention or one of its embodiments.

According to a fifth aspect of the invention a processing system is provided, comprising:

multiply redundant control units in a parallel configuration, each control unit having a target programmable unit according to claim 16 with at least one CPU and associated peripheral units, which control units each are connected to a respective allocated one of a corresponding number of emulation devices according to claim 26 for transferring emulation data to the respective allocated emulation device;

wherein the processing system is configured to
- compare the respective target integrity-control data and the respective emulation integrity-control data for the respective combination of external CPU and allocated emulation device;
- generate a respective integrity-warning signal if the respective target integrity-control data and the corresponding emulation integrity-control data are not identical;
- select computing results received from one of the redundant control units for outputting, using a selection criterion that excludes any computing result, which is associated with an integrity-warning signal.

The procedure and device for emulating a programmable unit known from the WO 2006/117377 A1 are thus improved in different embodiments of the present invention in that a reliable detection of an integrity violation, such as a divergence between the central processing units (CPUs) of the target programmable unit and the emulation device is enabled.

BRIEF DESCRIPTION OF THE DRAWINGS

These and other aspects of the invention will be apparent from and elucidated with reference to the embodiments described hereinafter. In the following drawings

DESCRIPTION OF PREFERRED EMBODIMENTS

The invention involves recognition of possible causes of an integrity violation such as a divergence between the central processing units (CPUs) of the target programmable unit and the emulation device during execution of a computer program. Before describing details of preferred embodiments of the present invention, such causes are discussed below. The discussion also underlines the importance of the improvement made by the present invention.

One cause of a divergence between the target CPU and the emulation CPU can be a disturbance in the communication between the target programmable unit and the external emulation device. Such disturbance may be caused by a defect in a cable in the communication link between the target programmable unit and the external emulation device. Causes for divergence lying in the target CPU can be reading errors in accessing the program memory, for instance generated by an instability of a Flash memory cell, an incorrect bus timing, or a disturbance on the bus. Furthermore, there may be reading errors in accessing data memory, for instance caused by an instability in a RAM cell, an incorrect bus timing, or disturbances on the bus. Furthermore, soft errors may occur in the target CPU. As is well known, a soft error is an incorrect signal or datum, which are caused for instance by voltage fluctuations, electromagnetic fields, or radiation, in particular, radioactive radiation. The term soft error is not used for incorrect signals caused by a mistake in design or construction, or by breakage in a circuit component.

Other causes for a divergence between the target CPU and the emulation CPU can be due to the emulation CPU, which can for instance be implemented incorrectly. Also, units, which are close to the CPU, such as the DMA controller may exhibit implementation errors. Another causes may be an incorrect implementation or configuration of the data memory in the emulation CPU or an incorrect implementation or configuration of the program memory of the emulation CPU. Also, soft errors in the emulation CPU may cause a divergence.

A divergence between the target CPU and the emulation CPU in the execution of program code leads to trace data, which do not allow a meaningful analysis and debugging of software execution by a target microcontroller. In order to prevent that the CPU of the emulation device executes code different from that of the target CPU, such situations of divergence are reliably detected during operation in the embodiments of the present invention, some of which will be described in the following with reference to the enclosed Figures.

Figure 1:
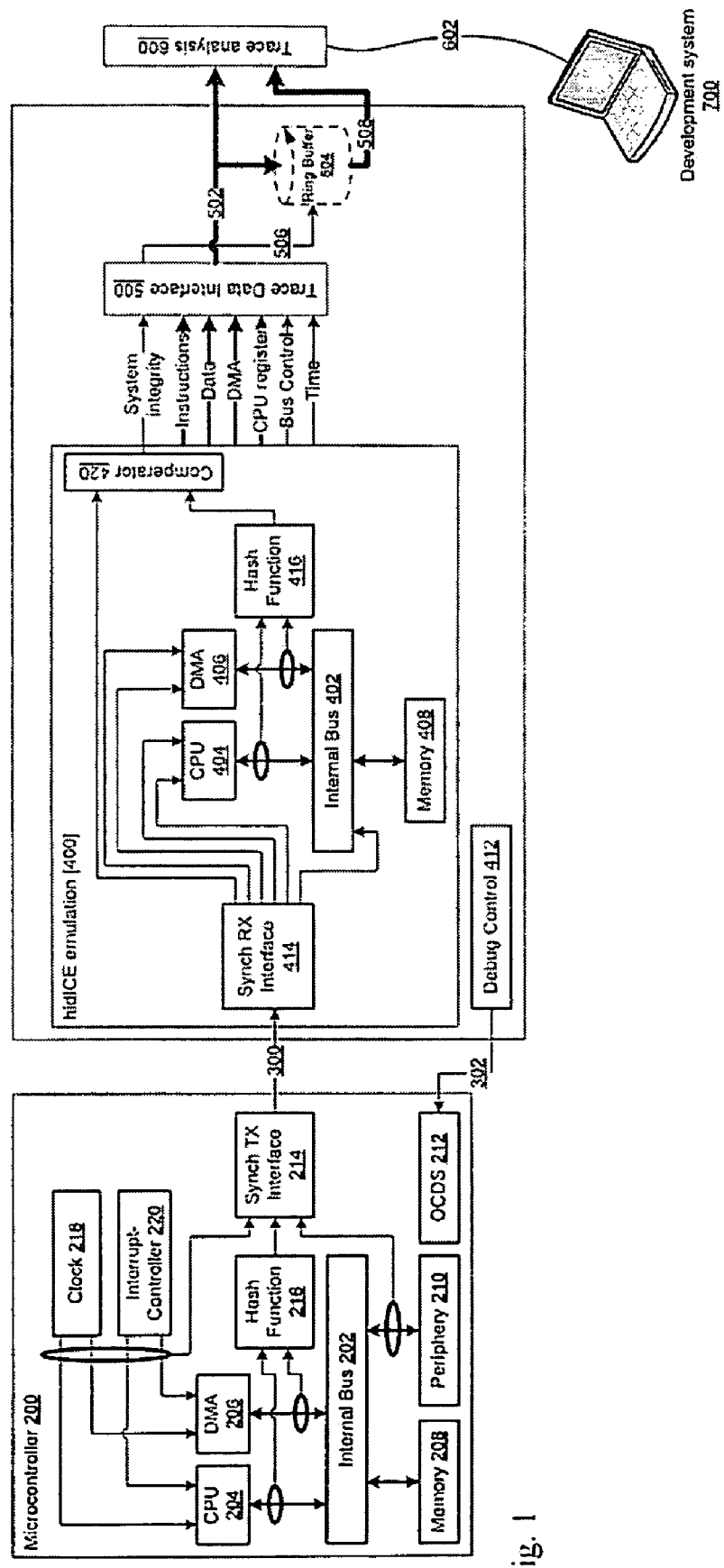
FIG. 1 is a schematic block diagram showing an embodiment of an apparatus for emulation of a programmable unit comprising a target programmable unit according to an embodiment of the invention and an emulation device according to embodiment of the invention.

FIG. 1 shows a schematic block diagram of an apparatus 100 for emulation (short: emulation apparatus) of a target programmable unit 200.

The target programmable unit 200 of the present embodiment is microcontroller. Since the technology of WO 2006/117377 A1 is applied, the microcontroller 200 used in the emulation apparatus 100 may be a mass product, i.e., it is not modified for the purpose of testing in comparison with microcontrollers of the same type and sold to customers using the microcontrollers for constructing end applications such as motor vehicles or any other microcontroller-driven device. In other embodiments, the target programmable unit may take the form of an evaluation chip used only in the context of testing and development of a microcontroller prototype by a manufacturer of microcontrollers.

An internal bus 202 of the microcontroller connects a CPU core 204 with a DMA controller 206, a memory 208, and peripheral units such as a input/output controller (not shown) a CAN controller, a UART controller, etc. The peripheral units are summarized in FIG. 1 by a block 210 labeled "periphery". Note that the DMA controller is optional and is therefore omitted in other embodiments.

The microcontroller 200 may further comprise an on-chip debug support (OCDS) module 212. The OCDS module 212 provides functionality for debugging software executed by the microcontroller, allowing a readout and writing of memory cell at runtime. The OCDS module 212 also provides a debugging interface to an external emulation device 400, for instance an interface in compliance with a standard IEEE ISTO 5001 (Nexus 5001), JTAG/OCDS, or other types of debugging interfaces. Note that the OCDS module 212 is not required for the invention.

A synchronization interface 214 provides functionality in the context of in-circuit emulation according to the technique of WO 2006/117377 A1. In particular, the synchronization transmission interface (in short: Synch TX interface) 214 is configured to collect and provide at its output to a communication link 300 initialization data, with which the microcontroller has initialized itself and/or has been initialized, for initializing emulation. Furthermore, the synchronization interface 214 is configured to collect and provide at its output in a defined relationship with a CPU clock signal, the following emulation data:
- data read by the CPU from a data bus of the target programmable unit, those external events that have an influence on a program counter.

In some embodiments, periodically created complete or partial copies of the register memory, and/or one or more data type signals are also included in the emulation data.

In general, the emulation data collected by the Synch TX interface 214 does not differ between different CPU architectures. Of course, differences may result from details of the CPU structures, such as bus width or instruction width. The emulation data in both cases comprises of pipeline clock signals, pipeline stop signals, reset sequences, interrupt sequences, interrupt numbers, and data read by the CPU. In one embodiment, the emulation data consists of these signals and data.

Communication lines, which branch off to the Synch TX interface 214 for emulation data collection are encircled in FIG. 1 by the far end of a respective arrow, which represents communication links between the corresponding functional blocks and the Synch TX interface 214.

In addition, the microcontroller 200 has a hash function unit 216. The hash function unit 216 is interconnected between the CPU 204 and the internal bus 202 on the input side and the Synch TX interface 214 on the output side. It collects bus signals such as data, addresses, instructions, bus control signals etc., and other signals, which are characteristic for the identification of system states. More specifically, internal data received by the hash function unit 216 on its input side comprises address data from the internal bus 202, payload data read by the CPU 204 and currently on the internal bus 202, address data on a program bus (not shown), payload data on the program bus, bus control signals and CPU flags. In the same way of graphical representation used above, those communication lines, which branch off to the hash function unit 216 for internal data collection are encircled in FIG. 1 by the far end of a respective arrow, which represents a communication links between the corresponding functional block and the hash function 216.

The hash function unit 216 serves to derive target integrity-control data from the internal data collected on the input side. This internal data is indicative of a respective code currently executed by the microcontroller 200. In order to derive the target integrity-control data, the hash function unit 216 is configured to calculate at least one hash code from the received internal data.

Preferably, a plurality of hash codes is calculated. Individual hash codes can be calculated from data indicative of executed instructions (OPCODE), addresses of the instructions executed (program counter), data read or written by the CPU, addresses of the data read or written by the CPU, data read or written by a DMA unit, bus control signals, and other signals. By calculation a plurality of hash codes, which each are specific for a certain signal or signal group on the internal bus, it becomes possible to derive, in case an integrity violation is observed, precise information on the cause of the integrity violation. If for instance respective hash codes calculated in the target and in the emulation from address data of instruction (i.e., program) code are found to differ from each other at the moment of detecting an integrity violation, the cause for the integrity violation is probably a read error that occurred in the memory.

In one embodiment, therefore, a respective first hash code is calculated from address data on the data bus of the target-internal bus and the emulation-internal bus, respectively; additionally or alternatively, a respective second hash code is calculated from payload data read by the CPU or transferred by DMA and currently on the data bus of the target-internal bus and the emulation-internal bus, respectively; additionally or alternatively, respective third and fourth hash codes are calculated from address data and payload data, respectively, on the program bus of the target-internal and emulation-internal buses; additionally or alternatively, a fifth hash is calculated from CPU flags on the emulation-internal and target-internal bus, respectively. Additionally or alternatively, a respective seventh hash is calculated from bus control signals on the target-internal and emulation-internal bus, respectively.

Of course, if less detailed information is required, any subset of these hash codes can be calculated, according to the needs of a particular application.

This embodiment enables a very detailed analysis and error tracking in the case of an observed divergence between the target and the emulation. Given this differentiated information, the error causing the divergence can be traced down with a much higher probability, which allows removing it faster and with better precision than possible on the basis of prior-art trace-monitoring systems.

The hash is calculated using a hash function implemented by the hash function unit 216. Many types of hash functions are known and suitable for implementation in the hash function unit 216. One example is the calculation of a check sum, which as such is well known in the art.

The hash function unit 216 suitably calculates the hash with respect to one clock cycle. However, in alternative embodiments, the hash calculation is performed with respect to a plurality of consecutive clock cycles, for instance with respect to a current and a next previous clock cycle. The calculated hash is fed to the Synch TX interface 214 and forwarded from there to the emulation device 400.

The transmission of the emulation data and of the target integrity-control data is in one embodiment performed through the communication link 300 in time multiplex. Other possibilities of transmitting the emulation data and the target integrity-control data will be discussed further below with respect to FIGS. 2 to 4.

Next, the structure and functionality of the emulation device 400 will be described. The emulation device 400 forms an emulation of the microcontroller 200. It thus comprises a structure that resembles that of the microcontroller 200. In particular, the structure formed comprises an emulation internal bus 402, an emulation CPU 404, an emulation DMA controller 206, and an emulation memory 408, which each correspond to the above-described functional units 202 to 208 of the microcontroller 200. Note that the emulation device need not comprise an emulation of the peripheral unit 210.

The emulation device 400 further comprises a synchronization receiver interface 414 (short: Synch RX interface), which allows communication of synchronization data from the Synch TX interface 214 of the microcontroller 200 to the emulation device 400 via the communication link 300. The Synch RX interface 414 thus provides the required emulation data to the emulation internal bus 402, the emulation CPU 404, and the emulation DMA unit 406. On the basis of the received emulation data, the emulation device emulates the operation the microcontroller 200. The principles of the emulation are known from WO 2006/117377 A1.

In addition to this functionality, the emulation device 400 provides for performing a system integrity control. For this purpose, an emulation hash function unit 416 that emulates the hash function unit 216 is contained in the emulation device 400 as in the microcontroller 200, the emulation of the hash function unit receives integrity-control data, which in the present context are referred to as emulation integrity-control data from the emulation internal bus 402, the emulation CPU 404 and the emulation DMA unit 406. The hash function implemented by the emulation hash function 416 is identical to that of the hash function unit 216 comprised in the microcontroller 200. The hash generated by the emulation hash function 416 is provided to a comparator 420. The comparator 420 receives at another input the hash calculated by the hash function unit 216 of the microcontroller 200, transmitted to the comparator via the communication link, and the Synch RX interface 414. The comparator 420 compares the hash codes provided by the microcontroller 200 and by the emulation device 400. The comparator provides at its output a system integrity signal, which is indicative of the result of the comparison performed. The emulation device 400 provides a set of trace data to a trace data interface 500. This is in accordance with the concept of WO2006/117377 A1, according to which trace data are not taken from the target microcontroller 200 but from its emulation in the emulation device 400.

The trace data provided to the trace data interface comprise an instruction trace, a data trace, a DMA data trace, a CPU register trace, and time stamps. The instruction trace captures data from an instruction address bus that connects the emulation CPU 404 with an instruction memory (not shown) and an instruction cache (not shown). The data trace comprises data communicated between a memory access control part of the CPU 404 and the memory 408 via a data address bus, and the outgoing and incoming bus lines of a data bus connecting the CPU and the memory. The DMA trace comprises payload data and addresses transferred via direct memory access.

The CPU register trace comprises the content of the CPU registers, and the time stamps trace comprises the time stamps derived from a clock signal, which, in a pipelined CPU architecture, is the pipeline clock signal.

In addition to the mentioned trace data, the stream of system integrity data generated by the comparator 420 is transferred to the trace data interface 500. This addition to the trace data set provides a unique capability to detect failures in target or emulation CPU operation. If the system integrity data received by a trace analysis unit 600 indicates that the target and emulation integrity-control data are different, a development system 700 connected with the trace analysis unit 600 can automatically stop the recording of the traces. This way, a complete trace providing information on the history of the program execution is obtained that led to the integrity violation, such as a divergence in program execution between the target microcontroller 200 and the emulation device 400. This trace information is a valuable aid in ascertaining the cause of the integrity violation, in particular if the cause is due to the target microcontroller.

In the prior art, such ascertainment of causes for the divergence is very difficult due to a lack of detailed information, and requires a much higher development cost, because the time of the occurrence of the mistake cannot be ascertained with enough precision. Furthermore, only specific evaluation chips provide a capability of ascertaining trace data by an embedded trace unit or the above-described bondout-chip architecture. These chips are, however, different from mass production chips, which often have a completely different circuit layout.

A ring buffer 504 or other type of FIFO memory can be connected with the output of the trace data interface. The ring buffer is optional and for this reason is shown with a dashed outline in FIG. 1. The ring buffer receives and buffers the system integrity data and trace data, comprising instructions, data, DMA, CPU register, bus control signals and time stamps, all provided by the trace data interface 500. During operation, when the ring buffer is completely filled with trace data, the oldest data stored is overwritten by the most recent data, as is well known from FIFO type buffer memories. Upon detecting a system integrity violation in the integrity data, the buffering of this data is stopped immediately in one embodiment, and the current content of the ring buffer is provided to the trace analysis system 600. To this end, a separate link can be provided between the ring buffer 504 and the trace analysis system. Alternatively, the ring buffer data is multiplexed onto the trace data line 502.

In one embodiment, the hash function implemented in the hash function units 216 and 416 is computed in a manner that allows reconstructing which of the input and output signals of the CPU caused the divergence. The input and output signals of the CPU comprise for instance instruction addresses, instruction code, read data, written data, etc. In addition, where provided, input and output signals of the DMA unit 406 (source address, destination address, data transferred) are included in the formation of the hash.

The emulation device 400 can be implemented as a field programmable array (FPGA) or as an application specific integrated circuit (ASIC), or as a combination of both. Some blocks, which are independent of a specific microprocessor structure to be emulated, can be provided as ASICS, for instance the Synch RX interface 414, and a trace data interface 500.

Figure 2:
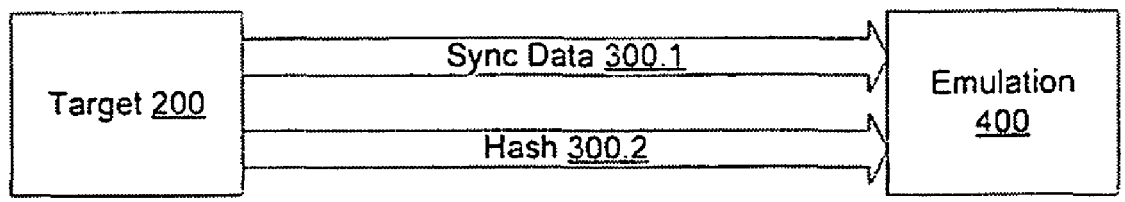
FIGS. 2 to 4 show schematic block diagrams of alternative embodiments of an apparatus for emulation of a programmable unit, implementing different solutions for transmission of synchronization data and target integrity-control data.
Figure 3:
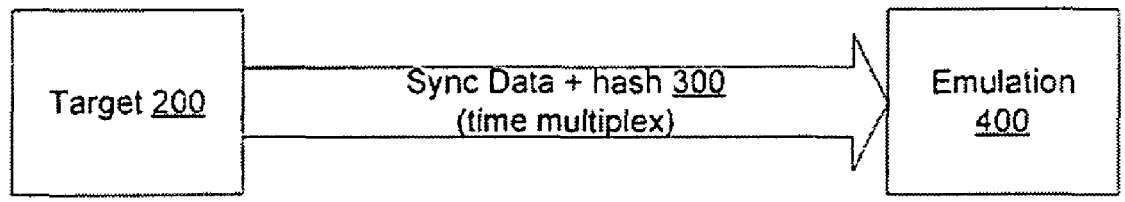
Figure 4:
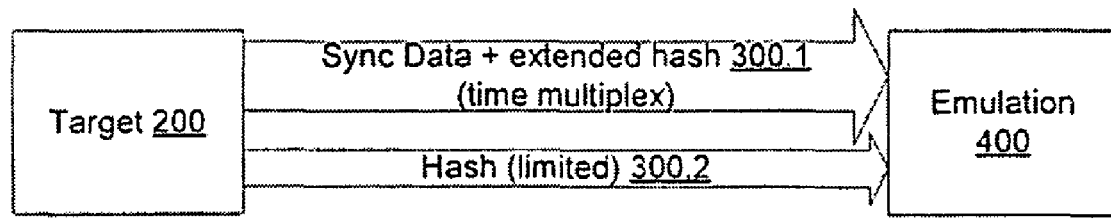

FIGS. 2 to 4 show alternative embodiments implementing different solutions for transmission of synchronization and targets integrity-control data. In the embodiment of FIG. 2, the emulation data and the hash codes are transmitted via separate communication links 300.1 and 300.2. These can be different cables or other communication channels.

In the embodiment of FIG. 3, the emulation data and the hash codes are transmitted via a single communication link, wired or wireless, in time multiplex. This allows saving I/O pins. The hash codes can be transferred at times, when no emulation data are to be transferred. This embodiment requires additional functionality on the side of the Sync TX interface 214 for controlling the time multiplex communication via the communication link 300. Also, the Sync RX interface 414 is provided with additional functionality that separates the emulation data from the target-integrity control data received via the communication link 300 before forwarding them to their destination.

A combination of the embodiments of FIGS. 2 and 3 is also possible. This is shown in FIG. 4. In this embodiment, hash codes are transmitted via a first communication link 300.1 when no emulation data is to be transferred. In addition, a limited amount of hash codes is continuously transferred to the emulation device. The hash codes transferred via the two communication links 300.1 and 300.2 together form a complete set of hash codes, which is combined in a hash trace in the Sync RX interface 414.

Figure 5:
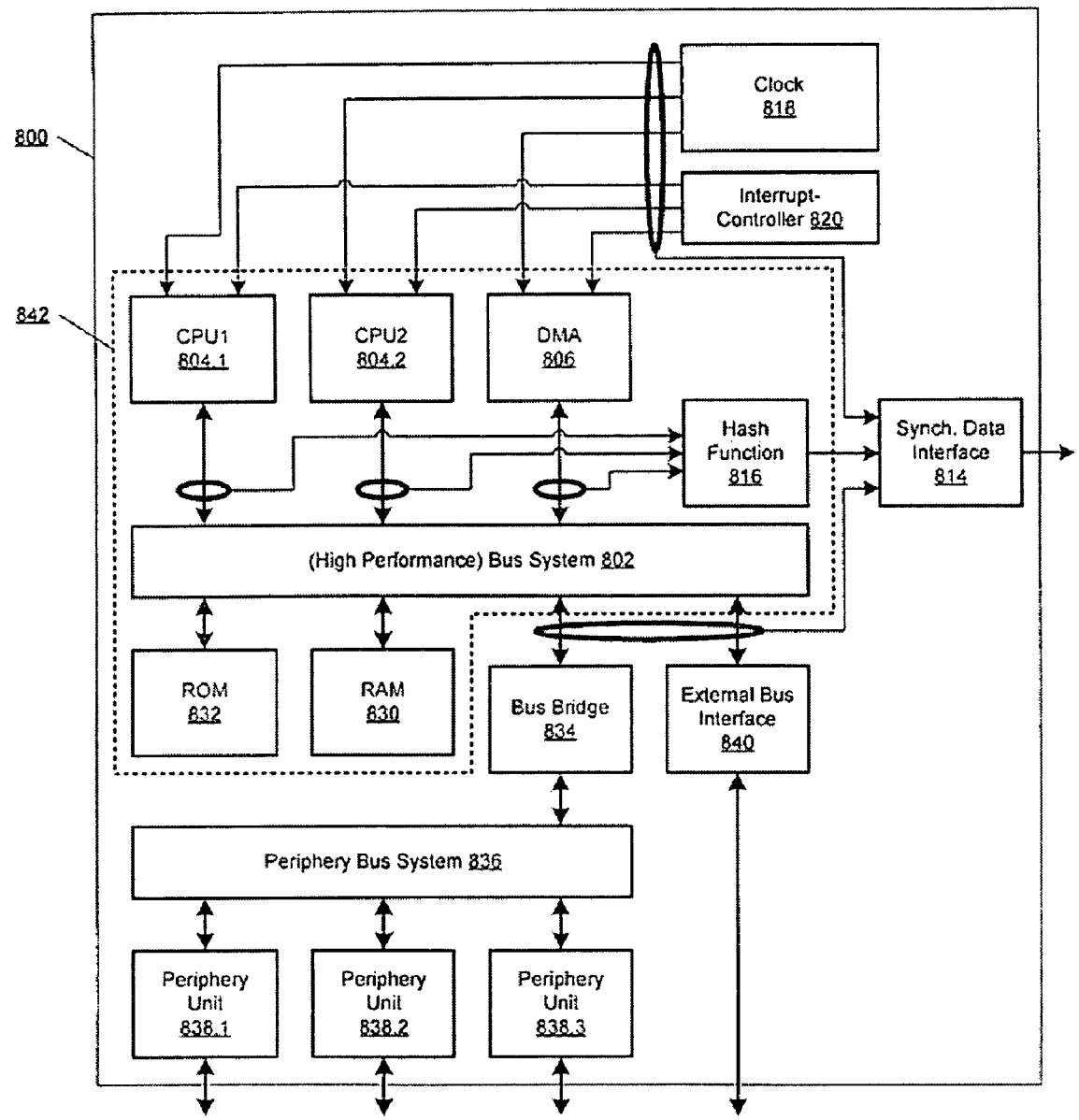
FIG. 5 is a schematic block diagram of an embodiment of an programmable unit having multiple CPU cores.

FIG. 5 is a schematic block diagram of microcontroller 800 that forms a further embodiment of the invention. The microcontroller 800 differs from the microcontroller 200 of FIG. 1 in that it has a multi-core processor architecture. In the present embodiment, two processor cores 804.1 and 804.2 are provided, accompanied by a DMA unit 806, a high-performance bus system 802, a hash function unit 816, a RAM 830, and a ROM 832. The number of processor cores or DMA units may be further increased in other embodiments. The functionality of the hash function unit corresponds to that of the earlier described embodiments. On the input side, the hash function unit receives the data exchanged between the first processor core 804.1 and the bus system 802, the data exchanged between the second processor core 804.2 and the bus system 802, and the data exchanged between the DMA unit 806 and the bus system 802. The hash codes calculated by the hash function unit 816 are provided to the SYNC data interface 814, along with other emulation data. In the present embodiment, the emulation data also comprises data exchanged between the bus system 802 and a bus bridge 834, which is connected between the bus system 802 and a periphery bus system 836. The periphery bus system serves three periphery units 838.1 to 838.3. Also, the data exchanged between the bus system 802 and an external bus interface 838 are fed to the SYNC data interface 814 for transmission to a connected emulation device (not shown). As before, the SYNC data interface also receives a clock signal from clock generator 818, and signals provided at the output of an interrupt controller 820 to the DMA unit 806 and the processor cores 804.1 and 804.2. All required data are in one preferred embodiment be ascertained form the bus system 802.

In the present embodiment, the emulation device (not shown) is an emulation of all functional units summarized by a dash-dotted line 842 in FIG. 5, i.e., the processor cores 804.1 and 804.2, the DMA unit 806, RAM 830, ROM 832, bus system 802, and the hash function unit 816. An emulation of the other functional units of the microprocessor 800 is not required.

Figure 6:
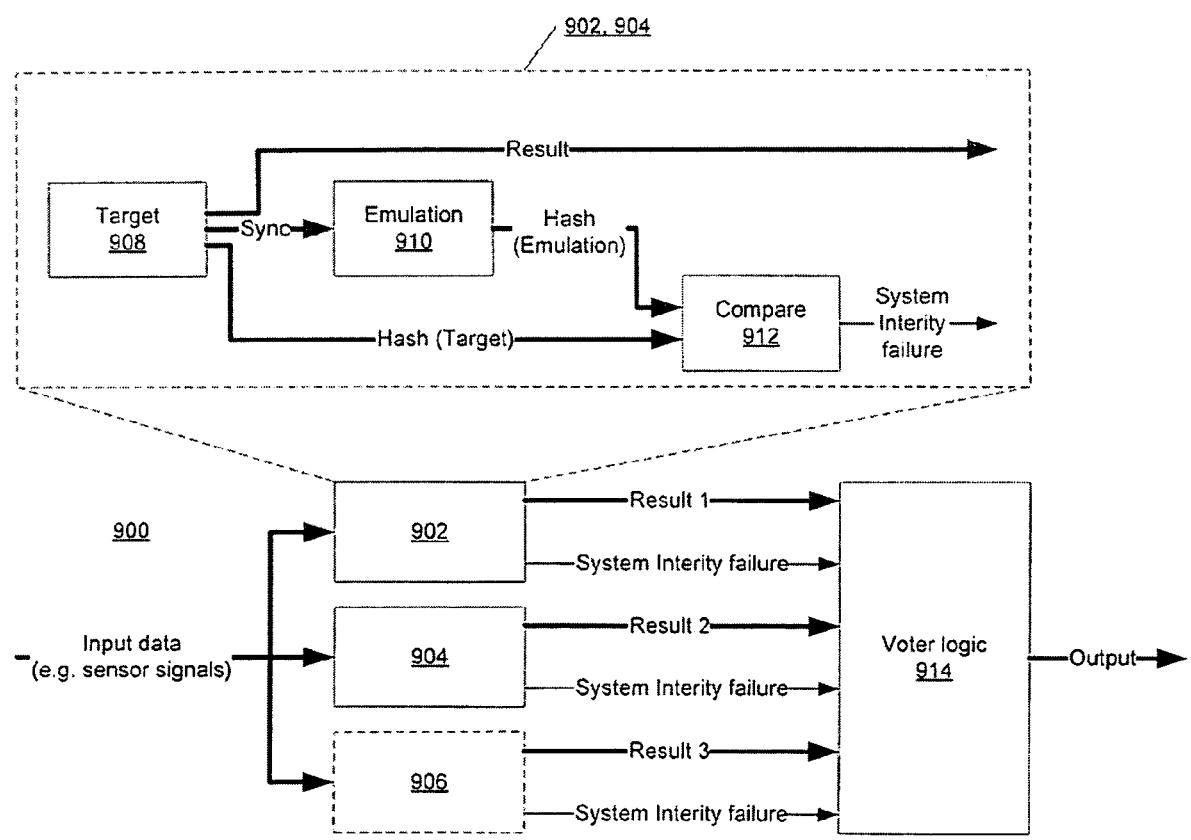
FIG. 6 shows an emulation device according to an embodiment of the invention.

FIG. 6 shows an embodiment of an emulation-apparatus arrangement 900. The emulation-apparatus arrangement 900 differs from those previously described in that two emulation apparatus 902 and 904, each comprising a target microcontroller 908 and an emulation device 910 with comparator logic 912, are provided in parallel. Each emulation device 910 is connected with one corresponding target microcontroller 908 of the corresponding multiply redundant microcontroller arrangement formed by microcontrollers 902 and 904. The addition of further target microcontrollers and emulation devices is an option, but not required.

In operation, each of the emulation devices derives respective emulation integrity-control data and receives respective target integrity-control data in the form of target hash codes from the allocated target programmable unit. The comparator 912 compares the respective target hash codes and the respective emulation hash codes for the respective combination of external CPU and allocated emulation device. A respective integrity-warning signal is generated if the hash codes are not identical.

Furthermore, a voter unit 914 is provided, which is configured to select the trace data received from one of the redundant emulation devices for storing and/or outputting, using a selection criterion that excludes a CPU, for which an integrity-warning signal has been generated. If no integrity-warning signal is present, the system output can be taken from either one of the incoming microcontroller output data (labeled "Result") in FIG. 6, which should be identical.

This embodiment is particularly useful for critical applications such as sensor or control applications, in which an operational failure may cause severe damage. An indication of a system integrity failure from one of the emulation devices, that is, a divergence between execution of code in the respective target and the associated emulation, will cause the voter to choose the other output data.

Thus, the system integrity indication provided by the present invention provides an important signal that allows weighting contradictory signals or data received from the redundant microcontroller systems, and discarding those signals or data, which are associated with a system that lost its integrity. A third redundant microcontroller is not required, in contrast to known voting schemes, which are based on a majority decision among an odd number of redundant systems.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A unit may fulfill the functions of several items recited in the claims. The mere fact that certain measures are recited in mutually different dependent claims does not indicate that a combination of these measured cannot be used to advantage.

What is claimed is:

1. A method for emulation of a target programmable unit, which has at least one CPU, by means of an external emulation device, which is coupled to the target programmable unit by means of a communication link, the method comprising the following steps:

transferring predetermined initialization data through the communication link to the emulation device, with which initialization data the target programmable unit has initialized itself and/or has been initialized, for initializing the emulation;

transferring through the communication link to the emulation device, a CPU clock signal and, in a defined relationship with the CPU clock signal, the following emulation data:

data read by the CPU from a data bus of the target programmable unit, those external events that have an influence on a program counter, optionally, periodically created complete or partial copies of the register memory, and, optionally, one or more data type signals;

emulating the target programmable unit in the external emulation device using the transferred emulation data;

ascertaining respective trace data from the emulation in the external emulation device;

storing and/or outputting the trace data;

deriving, in the target programmable unit and in the external emulation device, respective target integrity-control data and emulation integrity-control data from respective target-internal data and emulation-internal data, the target-internal data comprising or being indicative of data transferred on a target-internal bus connecting the CPU in the target programmable unit with a memory and peripheral units in the target programmable unit, and the emulation-internal data comprising data transferred on an emulation-internal bus connecting the CPU in the emulation device with a memory in the emulation device;

transferring the derived target integrity-control data from the target programmable unit to the external emulation device; and providing the target programmable unit with a multiply redundant processing system that has a plurality of at least two redundant control units in a parallel configuration, each control unit comprising one CPU and associated peripheral units;

providing a corresponding number of redundant emulation devices connected in parallel in a corresponding multiply redundant emulation processing system, each emulation device being connected with one corresponding control unit;

generating computing results in parallel at each of the redundant control units and allocated emulation devices;

deriving respective target integrity-control data and emulation integrity-control data at each of the redundant control units and allocated emulation devices;

comparing the respective target integrity-control data and the respective emulation integrity-control data for each combination of one control unit and its allocated emulation device;

generating a respective integrity-warning signal if the respective target integrity-control data and the corresponding emulation integrity-control data is not identical for a combination of one control unit and its allocated emulation device;

selecting a computing result generated at one of the redundant control units for outputting, using a selection criterion that excludes any computing result, which is associated with the integrity-warning signal.

2. The method of claim 1, wherein deriving the target integrity-control data and emulation integrity-control data by the target programmable unit and the external emulation device comprises ascertaining respective internal data selected from the group of payload data read or written by the CPU or transferred by DMA and currently on the data bus of the target-internal and the emulation-internal bus, respectively;

address data on a program bus of the target-internal and the emulation-internal bus;

payload data on the program bus of the target-internal and the emulation-internal bus;

bus control signals on the target-internal and the emulation-internal bus, respectively;

CPU flags.

3. The method of claim 1, wherein deriving the target integrity-control data and emulation integrity-control data comprises calculating at least one hash code of the internal data.

4. The method of claim 2, wherein a plurality of hash codes is calculated, each hash code being associated with an allocated type or group of types of respective internal data.

5. The method of claim 3, wherein calculating the hash code is performed with respect to one clock cycle.

6. The method of claim 3, wherein calculating the hash code is performed with respect a current and a next previous clock cycle.

7. The method of claim 1, wherein transferring the emulation data and the target integrity-control data from the target programmable unit to the external emulation device is performed through the communication link in time multiplex.

8. The method of claim 1, wherein transferring the target integrity-control data is performed through an integrity-control communication link separate from the communication link in parallel to transferring the emulation data.

9. The method of claim 1, wherein transferring the emulation data and a first part of the target integrity-control data from the target programmable unit to the external emulation device is performed through the communication link in time multiplex and wherein a second, complementary part of the target integrity-control data is transferred through a separate integrity-control communication link in parallel to transferring the emulation data or first part of the target integrity-control data.

10. The method of claim 7, wherein transferring the target integrity-control data and the emulation data comprises distributing the target integrity-control data and the emulation data over a fixed number of predetermined I/O-pins of the target programmable unit, and wherein the distributing is performed in dependence on respective momentaneous emulation data, which are currently to be transferred.

11. The method of claim 1, further comprising: comparing the derived target integrity-control data and emulation integrity-control data at the external emulation device.

12. The method of claim 1, further comprising: wherein the generating an integrity-warning signal is at the external emulation device.

13. The method of claim 1, further comprising: stopping the ascertaining of respective trace data at the external emulation device if the target integrity-control data and the emulation integrity-control data are not identical.

14. The method of claim 13, further comprising continuously storing the trace data in a ring buffer in the emulation device;

stopping the storage of trace data in the ring buffer upon detecting that the target integrity-control data and the emulation integrity-control data are not identical;

reading the trace data currently stored in the ring buffer after stopping the storage.

15. A programmable unit, which has at least one CPU, and an emulation port as a communication link for transferring emulation data to an external emulation device, wherein the programmable unit is configured to provide at the emulation port, in a defined relationship with a CPU clock signal of the programmable unit, the following emulation data for output through the communication link to the emulation device:

data read by the CPU from a data bus of the programmable unit, those external events that have an influence on the program counter, optionally, periodically created complete or partial copies of the register memory, and optionally, one or more data type signals;

provide the CPU clock signal as an output for transfer to the emulation device;

derive target integrity-control data from target-internal data, which target-internal data comprises or is indicative of data transferred on a target-internal bus connecting the CPU in the target programmable unit with a memory and peripheral units in the target programmable unit, and to provide the target-integrity data as an output;

provide the target programmable unit with a multiply redundant processing system that has a plurality of at least two redundant control units in a parallel configuration, each control unit comprising one CPU and associated peripheral units;

provide a corresponding number of redundant emulation devices connected in parallel in a corresponding multiply redundant emulation processing system, each emulation device being connected with one corresponding control unit;

generate computing results in parallel at each of the redundant control units and allocated emulation devices;

derive respective target integrity-control data and emulation integrity-control data at each of the redundant control units and allocated emulation devices;

compare the respective target integrity-control data and the respective emulation integrity-control data for each combination of one control unit and its allocated emulation device;

operate a respective integrity-warning signal if the respective target integrity-control data and the corresponding emulation integrity-control data is not identical for a combination of one control unit and its allocated emulation device; and select a computing result generated at one of the redundant control units for outputting, using a selection criterion that excludes any computing result, which is associated with the integrity-warning signal.

16. The programmable unit of claim 15, which is configured to derive the target-integrity control data from internal data of the programmable unit selected from the group of
    payload data read or written by the CPU or transferred by DMA and currently on the data bus of the target-internal bus;
    address data on a program bus of the target-internal bus;
    payload data on the program bus of the target-internal bus;
    bus control signals on the target-internal bus; and
    CPU flags.

17. The programmable unit of claim 15, which is configured to derive the target integrity-control data by calculating at least one hash code of the internal data.

18. The programmable unit of claim 17, which is configured to calculate a plurality of hash codes, each hash code being associated with an allocated type or group of types of respective internal data.

19. The programmable unit of claim 17, which is configured to calculate the hash code with respect to a current and a next previous clock cycle.

20. The programmable unit of claim 15, which is configured to transfer the emulation data and the target integrity-control data to the external emulation device through the communication link in time multiplex.

21. The programmable unit of claim 15, which is configured to transfer the target integrity-control data through an integrity-control communication link separate from the communication link in parallel to transferring the emulation data.

22. The programmable unit of claim 15, which is configured to transfer the emulation data and the target integrity-control data from the target programmable unit to the external emulation device through the communication link in time multiplex, and to transfer a predetermined reduced amount of target integrity-control data through an integrity-control communication link separate from the communication link in parallel to transferring the emulation data or the target integrity-control data through the communication link.

23. The programmable unit of claim 17, which comprises a state machine that is configured to transfer the target integrity-control data and the emulation data by distributing the target integrity-control data and the emulation data over a fixed number of predetermined I/O-pins of the programmable unit, and to distribute the mentioned data in dependence on respective momentaneous emulation data, which are currently to be transferred.

24. An emulation device, comprising
    an emulation port for communication with an external target programmable unit for receiving emulation data,
    a program memory for storing program code functionally identical to that stored in the external target programmable unit;
    wherein the emulation port is configured to receive a CPU clock signal from the target programmable unit and to receive in a defined relationship with the CPU clock signal of the target programmable unit the following emulation data:
    data read by the CPU of the external target programmable unit from a data bus of the target programmable unit,
    those external events that have an influence on the program counter,
    optionally, periodically created complete or partial copies of the register memory, and,
    optionally, one or more data type signals;
    wherein the emulation device is further configured to
    emulate the external target programmable unit using the transferred emulation data and program code stored in the program memory,
    receive target integrity-control data from the external target programmable unit, and
    derive emulation integrity-control data from emulation-internal data, which emulation-internal data is indicative of a respective code currently executed by the emulation device, and to provide the emulation-integrity data as an output;
    provide the target programmable unit with a multiply redundant processing system that has a plurality of at least two redundant control units in a parallel configuration, each control unit comprising one CPU and associated peripheral units;
    provide a corresponding number of redundant emulation devices connected in parallel in a corresponding multiply redundant emulation processing system, each emulation device being connected with one corresponding control unit;
    generate computing results in parallel at each of the redundant control units and allocated emulation devices;
    derive respective target integrity-control data and emulation integrity-control data at each of the redundant control units and allocated emulation devices;
    compare the respective target integrity-control data and the respective emulation integrity-control data for each combination of one control unit and its allocated emulation device;
    generate a respective integrity-warning signal if the respective target integrity-control data and the corresponding emulation integrity-control data is not identical for a combination of one control unit and its allocated emulation device; and
    select a computing result generated at one of the redundant control units for outputting, using a selection criterion that excludes any computing result, which is associated with the integrity-warning Signal.

25. The emulation device of claim 24, which is further configured to ascertain respective trace data from the emulation on the basis of the received emulation data, and to store and/or the output the trace data.

26. The emulation device of claim 24, which is configured to derive the emulation integrity-control data by ascertaining respective emulation-internal data selected from the group of
    payload data read or written by a CPU of the emulation device or transferred by DMA and currently on a data bus of an emulation-internal bus;
    address data on a program bus of the emulation-internal bus;
    payload data on the program bus of the emulation-internal bus;
    bus control signals on the emulation-internal bus; and
    CPU flags.

27. The emulation device of claim 24, which is configured to derive the emulation integrity-control data by calculating a hash code of the emulation-internal data.

28. The emulation device of claim 24, which is configured to calculate the hash code with respect to a current and a next previous clock cycle.

29. The emulation device of claim 24, which is configured to demultiplex emulation data and the target integrity-control data received from the external target programmable unit through the communication link in time multiplex.

30. The emulation device of claim 24, which is configured to receive the target integrity-control data through an integrity-control communication link separate from the communication link in parallel to receiving the emulation data.

31. The emulation device of claim 24, which is configured to demultiplex the emulation data and the target integrity-control data received from the target programmable unit through the communication link in time multiplex, and to receive a predetermined reduced amount of target integrity-control data through an integrity-control communication link separate from the communication link in parallel to receiving the emulation data or the target integrity-control data through the communication link.

32. The emulation device of claim 24, which is configured to compare the derived target integrity-control data and the emulation integrity-control data.

33. The emulation device of claim 32, which is configured to stop ascertaining respective trace data if the target integrity-control data and the emulation integrity-control data is not identical.

34. The emulation device of claim 33, further comprising a ring buffer, wherein the emulation device is configured
  to continuously store the trace data in the ring buffer during operation;
  to stop storing the trace data in the ring buffer upon detecting that the target integrity-control data and the emulation integrity-control data is not identical; and
  to provide the trace data stored in the ring buffer at the point of stopping the storage.

35. An apparatus for emulation of a programmable unit, comprising:
  a target programmable unit, comprising at least one CPU, and an emulation port as a communication link for transferring emulation data to an external emulation device, wherein the programmable unit is configured to
    provide at the emulation port, in a defined relationship with a CPU clock signal of the programmable unit, the following emulation data for output through the communication link to the emulation device:
      data read by the CPU from a data bus of the programmable unit,
      those external events that have an influence on the program counter,
      optionally, periodically created complete or partial copies of the register memory, and,
      optionally, one or more data type signals;
    provide the CPU clock signal as an output for transfer to the emulation device;
    derive target integrity-control data from target-internal data, which target-internal data comprises or is indicative of data transferred on a target-internal bus connecting the CPU in the target programmable unit with a memory and peripheral units in the target programmable unit, and to provide the target-integrity data as an output;
    provide the target programmable unit with a multiply redundant processing system that has a plurality of at least two redundant control units in a parallel configuration, each control unit comprising one CPU and associated peripheral units;
    provide a corresponding number of redundant emulation devices connected in parallel in a corresponding multiply redundant emulation processing system, each emulation device being connected with one corresponding control unit;
    generate computing results in parallel at each of the redundant control units and allocated emulation devices;
    derive respective target integrity-control data and emulation integrity-control data at each of the redundant control units and allocated emulation devices;
    compare the respective target integrity-control data and the respective emulation integrity-control data for each combination of one control unit and its allocated emulation device;
    operate a respective integrity-warning signal if the respective target integrity-control data and the corresponding emulation integrity-control data is not identical for a combination of one control unit and its allocated emulation device; and
    select a computing result generated at one of the redundant control units for outputting, using a selection criterion that excludes any computing result, which is associated with the integrity-warning signal;
  and an emulation device, comprising:
    an emulation port for communication with an external target programmable unit for receiving emulation data,
    a program memory for storing program code functionally identical to that stored in the external target programmable unit;
    wherein the emulation port is configured to receive a CPU clock signal from the target programmable unit and to receive in a defined relationship with the CPU clock signal of the target programmable unit the following emulation data:
      data read by the CPU of the external target programmable unit from the data bus of the target programmable unit,
      those external events that have an influence on the program counter,
      optionally, periodically created complete or partial copies of the register memory, and
      optionally, one or more data type signals;
    wherein the emulation device is further configured to
      emulate the external target programmable unit using the transferred emulation data and program code stored in the program memory,
      receive target integrity-control data from the external target programmable unit, and
      derive emulation integrity-control data from emulation-internal data, which emulation-internal data is indicative of a respective code currently executed by the emulation device, and to provide the emulation-integrity data as an output.

36. A processing system, comprising:
  multiply redundant control units in a parallel configuration, each control unit having a target programmable unit with at least one CPU and associated peripheral units, wherein the target programmable unit comprises an emulation port as a communication link for transferring emulation data to an external emulation device, wherein the programmable unit is configured to
    provide at the emulation port, in a defined relationship with a CPU clock signal of the programmable unit, the following emulation data for output through the communication link to the emulation device:
      data read by the CPU from a data bus of the programmable unit,
      those external events that have an influence on the program counter, optionally, periodically created complete or partial copies of the register memory, and optionally, one or more data type signals;

provide the CPU clock signal as an output for transfer to the emulation device;

derive target integrity-control data from target-internal data, which target-internal data comprises or is indicative of data transferred on a target-internal bus connecting the CPU in the target programmable unit with a memory and peripheral units in the target programmable unit, and to provide the target-integrity data as an output provide a corresponding number of redundant emulation devices connected in parallel in the corresponding multiply redundant emulation processing system, each emulation device being connected with one corresponding control unit;

generate computing results in parallel at each of the redundant control units and allocated emulation devices;

derive respective target integrity-control data and emulation integrity-control data at each of the redundant control units and allocated emulation devices;

compare the respective target integrity-control data and the respective emulation integrity-control data for each combination of one control unit and its allocated emulation device;

operate a respective integrity-warning signal if the respective target integrity-control data and the corresponding emulation integrity-control data is not identical for a combination of one control unit and its allocated emulation device; and select a computing result generated at one of the redundant control units for outputting, using a selection criterion that excludes any computing result, which is associated with the integrity-warning signal;

wherein each control unit is connected to a respective allocated one of the corresponding number of emulation devices configured to transfer emulation data to the respective allocated emulation device, wherein each emulation device comprises:

an emulation port for communication with the external target programmable unit for receiving emulation data, a program memory for storing program code functionally identical to that stored in the external target programmable unit;

wherein the emulation port is configured to receive a CPU clock signal from the target programmable unit and to receive in a defined relationship with the CPU clock signal of the target programmable unit the following emulation data:

data read by the CPU of the external target programmable unit from the data bus of the target programmable unit, those external events that have an influence on the program counter, optionally, periodically created complete or partial copies of the register memory, and optionally, one or more data type signals;

wherein the emulation device is further configured to emulate the external target programmable unit using the transferred emulation data and program code stored in the program memory, receive target integrity-control data from the external target programmable unit, and derive emulation integrity-control data from emulation-internal data, which emulation-internal data is indicative of a respective code currently executed by the emulation device, and to provide the emulation-integrity data as an output.

\* \* \* \* \*